United States Patent [19]

Watanabe

[11] Patent Number: 4,833,548
[45] Date of Patent: May 23, 1989

[54] SYSTEM FOR READING AND STORING COMPOSITE INDEX CODE FROM A RECORDING DISK

[75] Inventor: Tsuyoshi Watanabe, Saitama, Japan

[73] Assignee: Pioneer Electronic Corporation, Tokyo, Japan

[21] Appl. No.: 95,717

[22] Filed: Sep. 14, 1987

[30] Foreign Application Priority Data

Sep. 12, 1986 [JP] Japan .................................. 61-216802

[51] Int. Cl.⁴ .............................................. H04N 5/76
[52] U.S. Cl. .................................. 358/342; 360/72.1; 369/54
[58] Field of Search .............. 358/342; 360/72.1, 72.2; 369/54, 57

[56] References Cited

U.S. PATENT DOCUMENTS 4,660,100  4/1987  Sugiyama et al. .................. 358/342
4,680,647  7/1987  Moriyama ........................... 358/343

Primary Examiner—L. T. Hix
Assistant Examiner—D. Rutledge
Attorney, Agent, or Firm—Sughrue, Mion, Zinn, Macpeak & Seas

[57] ABSTRACT

A system for reading index codes from a disk divided into a low speed digital region and a high speed video region. Each of the regions has a read-in area containing index codes for both the regions. When either read-in area is read, the index codes are stored in a common memory with the index codes of one region being stored in sequence form one end of the memory and those of the other region being stored in sequence from the other end.

3 Claims, 4 Drawing Sheets

SYSTEM FOR READING AND STORING COMPOSITE INDEX CODE FROM A RECORDING DISK

FIELD OF THE INVENTION

The present invention relates to a system for reading and storing a composite index code on a recording disk, in which index codes related to the recorded contents are repeatedly recorded in a read-in area.

BACKGROUND OF THE INVENTION

A disk is known for digital signal recording which is a small-sized digital audio disk having a diameter of about 12 cm, which is called a compact disk (CD). Recently, however, there has been developed a disk of the same diameter as the compact disk on which in addition to a PCM (pulse code modulation) signal, an FM-modulated video signal and a PCM signal are recorded in a superimposed state (hereinafter, referred to as a composite disk).

In the case of such a composite disk as described above, information is recorded, for example, in two regions in such a manner that PCM-modulated audio information is recorded in a first region located at the inner circumferential side of the disk and an FM-modulated video signal and a PCM-modulated audio signal are recorded in a superimposed state in a second region located at the outer circumference outside a predetermined radial position of the disk.

In such a compact disk, index codes related to recorded contents, for example, information representing the number of recorded music, the total absolute time, the playing time for every music piece, and so on, are recorded in a read-in area in order to perform special reproduction such as search, skip, etc. Accordingly, in reproduction, the information recorded in the read-in area is read out prior to reproduction of the program information. This applies also to a composite disk in order to perform such special reproduction.

In the case of a composite disk, however, the recording region is divided into two divided recording regions so that a read-in area is provided in each of the divided recording regions and different information is recorded in the divided recording regions and therefore there exist two kinds of index codes corresponding to the divided recording regions. In order to perform special reproduction from both of the two divided regions, it is necessary to record each of the two kinds of index codes not only in the read-in area of the divided recording region corresponding to the index code in question but in the read-in area of the other divided recording region corresponding to the other index code. Those index codes recorded in those two read-in areas are read out prior to reproduction of program information and stored in a memory for every region corresponding to the index code. Accordingly, in storing those read-out index codes, it is desired to use the memory efficiently

SUMMARY OF THE INVENTION

The present invention has been attained in view of the foregoing points. Therefore an object of the invention is to provide a system for reading and storing a composite index code on a recording disk, in which a memory can be efficiently used in storing two kinds of read-out index codes.

According to the present invention, the system for reading and storing a composite index code on a recording disk is provided, at least on its one surface, with a first region in which only a predetermined digital signal is recorded and a second region in which a frequency-modulated video signal and a predetermined digital signal are recorded in a superimposed state. Each of the first and second regions have a read-in area in which there coexist a first and a second index code group constituted by repetition of index codes related to the contents recorded in the first and second regions. Each of the index code include identifying information representing the region to which the index code belongs. The system is characterized in that the first and second index code groups are read out of the read-in areas and the read-out data of one of the first and second index code groups are read out of the read-in areas and the read-out data of one of the first and second index code groups are stored in a common memory region from its higher address side while the read-out data of the other index code group are stored in the common memory region from its lower address side.

DETAILED DESCRIPTION OF THE PREFERRED EMBODIMENTS

A description will be presented in detail hereunder as to an embodiment according to the present invention with reference to the accompanying drawings.

Figure 1:
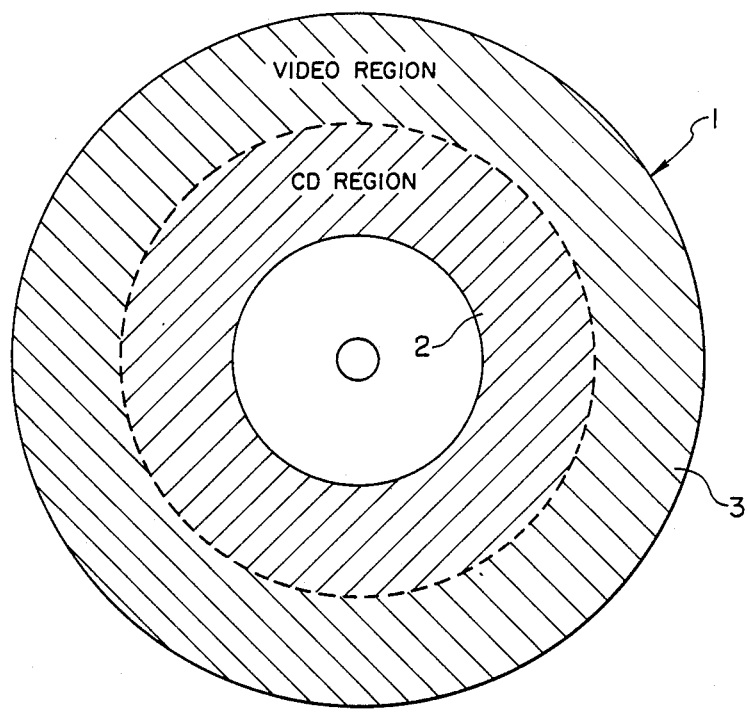
FIG. 1 is a diagram showing sections in the recording region of a composite disk.
Figure 2:
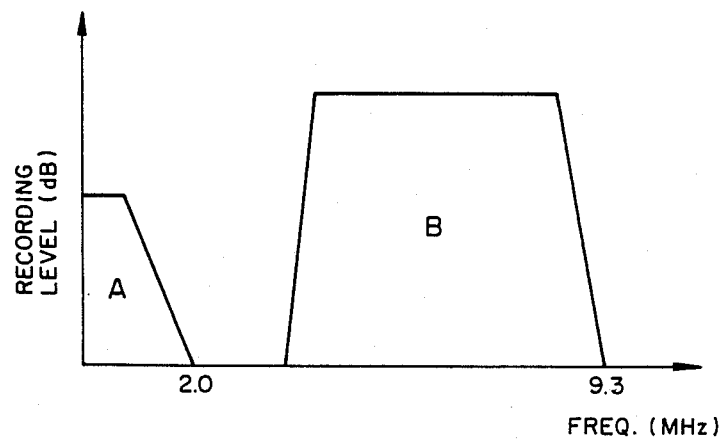
FIG. 2 is a diagram showing frequency sectra of a signal recorded in the video region of the composite disk.
Figure 3:
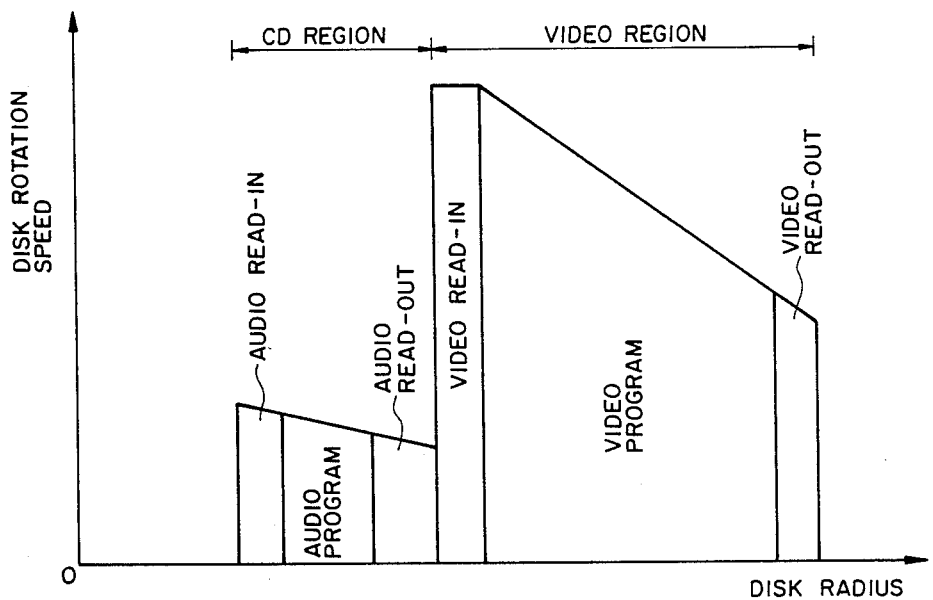
FIG. 3 is a diagram showing sections of the information recording region of the composite disk.

A composite disk 1 according to the present invention shown in FIG. 1 is provided with a first region 2 (hereinafter, referred to as a CD region) which is disposed at the inner peripheral side of the composite disk 1 and in which, for example, PCM-modulated audio information is recorded. It is also provided with a second region (hereinafter, referred to as a video region) 3 in which an FM-modulated video signal and a PCM-modulated audio signal are recorded in a superimposed state. The video signal contains a high frequency component in comparison with the PCM signal and FIG. 2 shows frequency spectra of the signals recorded in the video region 3. In FIG. 3, the frequency components A and B represent respectively the PCM signal and the video FM signal.

Therefore, when a signal is recorded in the video region 3, it is necessary to increase the rotational speed of the disk above that when a signal is recorded into the CD region 2. Consequently, as a matter of course, when reproduction is performed from the video region 3 it is necessary to make the rotational speed of the disk higher than that when reproduction is performed from the CD region 2. As shown in FIG. 3, the rotational speed is several hundreds of r.p.m. in the CD region 2, while the rotational speed is made exceedingly high in the video region 3, that is, two thousand and several hundreds of r.p.m. at the innermost circumference of the region 3 and one thousand and several hundreds r.p.m. at the outermost circumference of the same.

Read-in areas are formed at the head portions of the CD region 2 and the video region 3 respectively so that a first and a second index code group are recorded in the respective read-in areas. These two code groups are constituted correspondingly to the recording regions by repetition of index codes concerning the contents of record in the respective regions, for example, index codes representing start time, finish time, etc., of small portions constituting the recording regions. The reason why each of the index code groups contains duplicates of the index codes is that even if no index code is read out in a certain portion because of so-called drop-out or the like at that portion, the index codes can be read out at the other duplicate portions.

As a system for recording those index codes in the read-in area, it is possible to consider a system in which a first index code group corresponding to the CD region 2 is recorded and then a second index code group corresponding to the video region 3 is recorded. In reproduction of a disk in which index codes are recorded in such a system as described above, there is a possibility that is there are a large number of index codes recorded for the CD region 2. Therefore, it takes a long time before the index codes related to the video region 3 are read out so that the initializing time of a player is prolonged.

Therefore, the embodiment according to the present invention employs such a recording system in which each of the index codes constituting each of the first and second index code groups is additionally provided with identifying information indicating the region (the CD region or the video region) to which the index code belongs. The index codes are recorded alternately so that the index codes of the first and the second index group may be selected. That is, the index codes of the first and second index groups coexist in each of the read-in areas.

Figure 4:
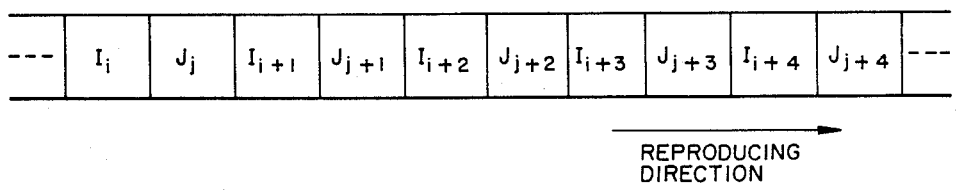
FIG. 4 is a diagram for explaining the system for recording the index codes in the read-in area of the composite disk.

That is, as shown in FIG. 4, the index codes of the CD region 2 and the video region 3 are alternately and successively recorded in the read-in area. In the drawings, in order to simplify the notation, the index codes of the CD region 2 and the video region 3 are represented by I and J respectively and the sequence of the index codes is represented by a subscript. Although being identified by the characters I and J for the sake of simplification of the notation, each of the index codes of each of the respective regions actually contains the identifying information indicating the region to which the index code belongs. For example, the identifying information is recorded as a "1" when the index code belongs to the CD region 2 while the identifying information is recorded as a "4" when the index code belongs to the video region 3.

Next, description will be made as to the arrangement of a player for reproducing such a recording disk having composite index codes as described above.

Figure 5:
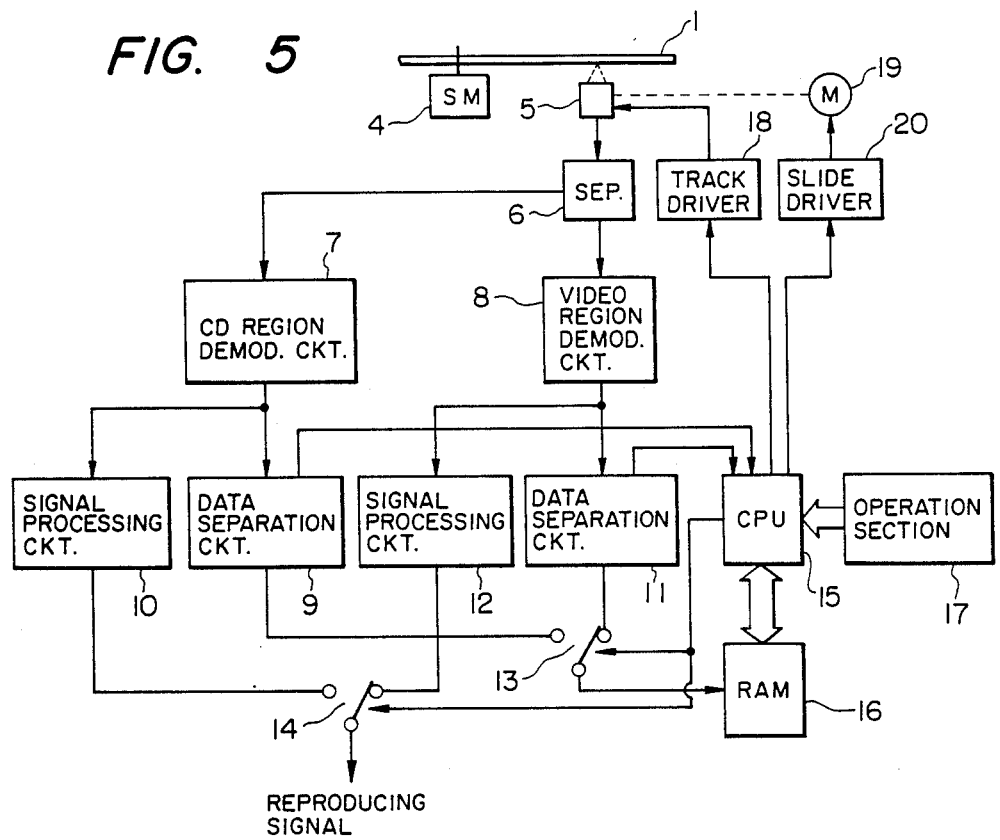
FIG. 5 is a block diagram showing the arrangement of a composite disk player.

In FIG. 5, a disk 1 is driven to rotate at one of the two speeds by a spindle motor 4 dependent on whether the CD region or the video region is being read. Information recorded on the disk 1 is read out by an optical pickup 5. The optical pickup 5 is provided therein with a laser diode acting as a light source, an optical system including an objective lens, a photodetector for receiving reflected light from the disk 1, a focus actuator for controlling the position of the object lens relative to an information recording surface of the disk 1, a tracking actuator for controlling the position of a beam spot emitted from the pickup 5 relative to a recording track of the disk 1 in the radial direction of the latter, and so on.

High frequency (RF) signals read out of the CD region 2 and the video region 3 are supplied respectively from the pickup 5 to a CD region demodulating circuit 7 and a video region demodulating circuit 8 through a separation circuit 6. The demodulated output of the CD region demodulating circuit 7 is supplied to a data separation circuit 9 so that index code data recorded in the read-in area are separately extracted therefrom and supplied to a signal processing circuit 10 so as to be subject to predetermined signal processing to thereby obtain a preproduced signal. Similarly to this, the demodulated output of the video area demodulating circuit 8 is supplied to a data separation circuit 11 so that index code data recorded in the read-in area are separately extracted and supplied to a signal processing circuit 21 so as to be subject to predetermined signal processing to thereby obtain a reproduced signal.

Figure 6:
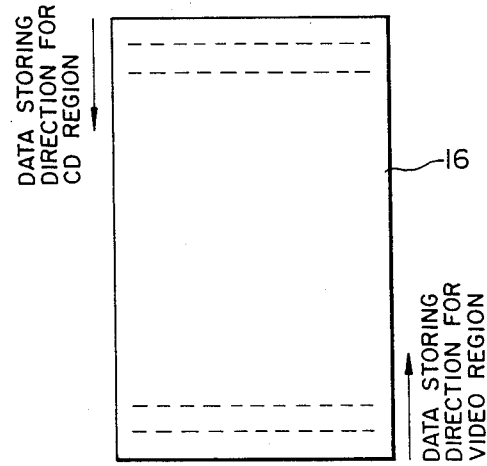
FIG. 6 is a diagram showing the memory region in the RAM of the composite disk player of FIG. 5.

Change-over switches 13 and 14 are arranged to be switched by a CPU (central processing unit) 15 in accordance with a selected reproducing region. The change-over switch 13 is arranged to alternatively supply the index code data separately extracted by the data separation circuits 9 and 11 to a RAM (random access memory) 16, while the change-over switch 14 is arranged to alternatively select the outputs of the signal processing circuits 10 and 12 as the reproduced signal. When the index code data are separately extracted, the data separation circuits 9 and 11 detect identifying information contained in the index code data recorded in the read-in areas and to send these identifying signals directly to the CPU 15. These identifying signal represent the fact that the separated index code data are related to the contents recorded in the CD region (the first index code group) or are related to the contents recorded in the video region (the second index code group). The memory region of the RAM 16 is arranged so as to be commonly used as shown in FIG. 6. The CPU 15 controls the RAM 16 so as to distribute the index code data to be stored in the RAM 16 in accordance with the identifying signals sent from the data separation circuits 9 and 11. The index codes are stored in such a manner that the index code data related to the contents recorded in the CD region are stored, for example, from the higher address side of the memory region of the RAM 16 and the index code data related to the contents recorded in the video region are stored from the lower address side of the same. Therefore, in reproducing a disk in which information is recorded in both the regions, that is, the CD region 2 and the video region 3, data are stored in the memory region of the RAM 16 alternately from the higher address side and from the lower address side of the memory region.

In reproducing the disk by the player, the region to be reproduced (CD or video), functions, and so on are designated from an operation section 17 and supplied to the CPU 15 so that the CPU 15 reads data necessary for the execution of the function out of the memory region on the basis of the designated information, and sends control signals on the basis of the read-out data. For example, it sends the control signals to and thus controls a tracking driving circuit 18 for drive-controlling the tracking actuator in the pickup 5, a slider driving circuit 20 for drive-controlling a slider motor 19 acting as a driving source for moving the pickup 5 in the radial direction of the disk, and the spindle motor for controlling the speed.

Figure 7:
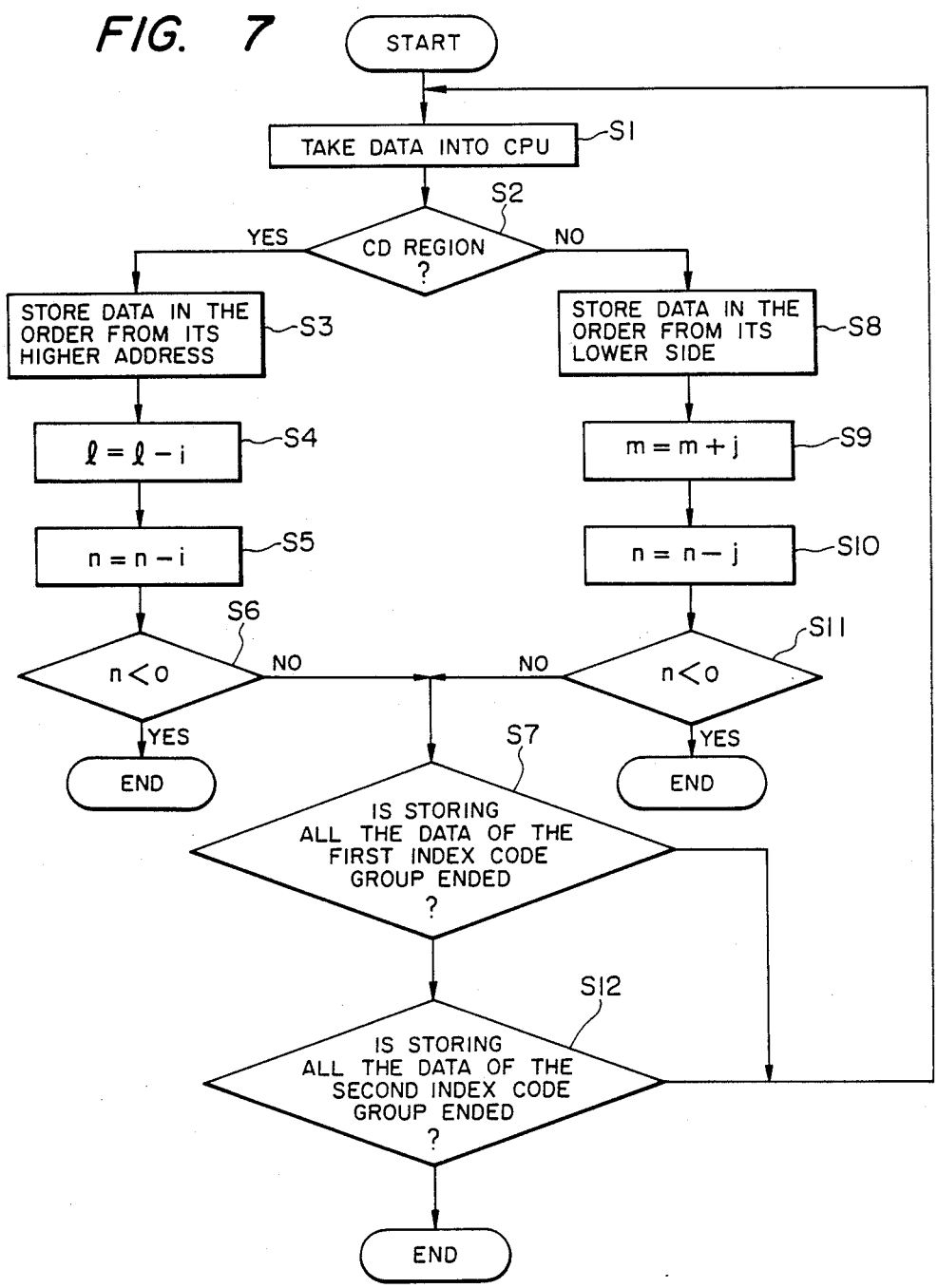
FIG. 7 is a flowchart for explaining the processing procedure to be executed by the CPU in the composite index code reading and storing system according to the present invention.

Next, referring to the flowchart of FIG. 7, a description will be presented as to the processing procedure to be executed by the CPU 15 in the composite index code reading and storing system according to the present invention.

First, the index codes in the read-in area are read out in the initialization prior to reproduction, and the read-out data are input into the CPU 15 (in step S1). Judgment in step S2 as to whether or not the index code data are related to the contents recorded in the CD region 2 (the first index code group). This judgment is made on the basis of the identifying information (for example, "1" in the case of the CD region and "4" in the case of the video region) contained in the read-out index code. If the judgment proves that the index code data belong to the CD region, the read-out data are stored in step S3 in the memory region of the RAM 16 in sequence from its higher address side toward its center portion.

Assume now that an address designation for the CD region is represented by l and storable number designation (a vacant area of the memory) is represented by n and that one block of data of the index code related to one of the contents recorded in the CD region 2 requires i bytes. The address designation l is decreased by i bytes in step S4 after the data have been stored in step S3, and then the storable number designation n is also decreased by i bytes in step S5. Judgment is made in step S6 as to whether or not further data can be stored in the memory (that is, n<0). If not, the data take-in and storage operation is ended at that point. If, on the contrary, the judgment proves that further data can be stored in the memory in step S6, further judgment is made in step S7 as to whether or not storing of all the data of the first index code group is ended. If not, the operation is returned back to step S1, and the foregoing operation is repeated.

If, on the other hand, the judgment proves that the read-out in the step S2 are related to the contents recorded in the video region (the second index code group), the read-out data in step S8 are stored in the memory region of the RAM 16 in order from its lower address side toward its center portion. Assume now that address designation for the video region is represented by m (which is less than l) and one data of the index codes related to the contents recorded in the video region 3 requires j bytes. The address designation m is increased by j bytes in step S9, and then the storable number designation n is decreased by j bytes in step S10. Judgment is made in step S11 as to whether or not further data can be stored in the memory (n<0). If not, taking-in of the data is ended at that point in time. If the judgment in step S11 proves, on the contrary, that further data can be stored in the memory, further judgment is made in step S7 as to whether or not storing of all the data of the first index code group is ended. If not, the operation is returned back to step S1, and the foregoing operation is repeated. If this judgment proves on the contrary that the storing of all the data of the first index code group is ended, further judgment is made in step S12 as to whether or not storing of all the data of the second index code group is ended. If not, the operation is returned back to step S1, and the foregoing operation is repeated. If the judgment of step S12 proves on the contrary, that storing of all the data of the second index code group is ended, the data taking-in and storing operation is ended at that point.

The operation described above is for the case of reproduction of a composite disk in which information is recorded in both the CD region 2 and the video region 3. Therefore, in reproducing such a disk, data are recorded by the foregoing operation into the memory region of the RAM 16 alternately from its higher address side and from its low-address side.

Further, in reproducing of a composite disk in which information is recorded only in the CD region 2 or only in the video region 3, data are stored in the memory region of the RAM 16 only from its higher address side or from its lower address side respectively.

Although the index code data related to the contents recorded in the CD region 2 are stored in the memory region from its higher address side and the index code data related to the contents recorded in the video region 3 are stored in the memory from its lower address side in the foregoing embodiment, it is a matter of course that the arrangement can be made so as to make recording in a reversed manner.

Further, although the data taking-in and storing operation is ended at a point in time when data have been stored in the entire memory region (the steps S6 and S11) in the foregoing embodiment, the arrangement can be made such that the data taking-in and storing operation is ended at a point in time when a reasonable number of the index code data in view of the design have been stored.

As described above, according to the present invention, in reproducing a recording disk in which first and second index code groups coexist in a read-in area, the first and second index code groups are read out of the read-in area. The read-out data of one of those index code groups are stored in the common memory region from its higher address side while the read-out data of the other index code group are stored in the common memory region from its lower address side, so that it is made possible to successively store data independently of the fact that there is any difference in number or not between data of both the index code groups. Accordingly, not only time taken for storing data can be shortened but the memory region can be efficiently used. Further, the start point of each of the index code data is determined in advance, and each of the data can be read out in a short time, so that processing time for special reproduction can be shortened.

What is claimed is:

1. A system for reading and storing a composite index code from a recording disk, comprising:
   means for selectively reading in sequence from either a first read-in area or a second read-in area of a recording disk a first group of index codes and a second group of index codes, said disk comprising a first region recorded with a first predetermined digital signal and said first and second groups of index codes and a second region recorded with a frequency-modulated video signal and a second predetermined digital signal in a superimposed state therewith and said first and second groups of index codes, each of said index codes including identifying information representing to which of said two regions said identifying code belongs;

a memory; and means for storing said read index codes in said memory, said stored index codes of a first one of said groups being stored in sequence from a higher address side of said memory and said stored index codes of a second one of said groups being stored in sequence from a lower address side of said memory.

2. A system as recited in claim 1, further comprising means for rotating said disk within a first range of speeds when said reading means is reading from said first region and within a second range of speeds, higher than said first range, when said reading means is reading from said second region.

3. A system as recited in claim 1, wherein each of said first and second read-in areas contain duplicates of said first and second groups of index codes.

* * * * *